United States Patent [19]

Beyer et al.

[11] Patent Number: 5,463,021
[45] Date of Patent: Oct. 31, 1995

[54] PROCESS FOR WORKING UP AQUEOUS DISPERSIONS OF FLUORINATED THERMOPLASTIC

[75] Inventors: Gerhard Beyer, Burgkirchen; Reinhard Sulzbach; Eduard Wess, both of Burghausen; Rolf Hengel, Burgkirchen, all of Germany

[73] Assignee: Hoechst Aktiengesellschaft, Germany

[21] Appl. No.: 132,741

[22] Filed: Oct. 6, 1993

[30] Foreign Application Priority Data

Oct. 8, 1992 [DE] Germany .......................... 42 33 824.7

[51] Int. Cl.⁶ ........................................................ C08F 6/16
[52] U.S. Cl. ............................ 528/482; 528/499; 528/501; 528/502 C
[58] Field of Search ....................... 528/482, 499, 528/501, 502

[56] References Cited

U.S. PATENT DOCUMENTS 2,593,583  4/1952  Lontz ........................ 260/92.1
3,046,263  7/1962  Whitlock .................... 260/92.1

FOREIGN PATENT DOCUMENTS 3439343  5/1985  Germany .

*Primary Examiner*—Joseph L. Schofer
*Assistant Examiner*—Tom Weber

[57] ABSTRACT

The aqueous dispersions from the polymerization of fluorinated thermoplastics can be worked up to a high value product (e.g., substantially purified of cations resulting from the polymerization) in a continuous manner, if the cations are first removed from the aqueous dispersion, the dispersion is then compressed and decompressed through small openings, thereby being coagulated, the coagulated phase is washed on a filter and partially dewatered, subsequently broken up to give a free-flowing product and this is dried to the desired residual moisture content. Qualitatively high value products, which can be directly fed to a melt extruder, are thus obtained with high throughputs.

13 Claims, No Drawings

PROCESS FOR WORKING UP AQUEOUS DISPERSIONS OF FLUORINATED THERMOPLASTIC

DESCRIPTION

The invention relates to a process for working up aqueous dispersions of fluorinated thermoplastics, which process can be operated continuously and produces a high value product with high throughputs.

The process of the invention comprises
substantially replacing by hydrogen ions the cations in the aqueous dispersion resulting from the polymerization,
compressing the dispersion, if necessary after dilution with water,
decompressing the compressed dispersion through one or more small opening(s), thereby coagulating it,
transferring the coagulated phase, if necessary after dilution with water and/or heating, onto a filter,
washing the coagulate there,
preliminary dewatering the coagulate mechanically,
breaking it up to give a free-flowing product and
if necessary drying it to the desired residual moisture content.

Preferred embodiments of the invention are explained in greater detail below.

The process is so designed that all parts can be carried out continuously. It is naturally also possible to carry out continuously only some of the steps mentioned, and to carry out the remainder batchwise. Continuous operation is preferred, as it is not only economic, but also ensures a uniformly high product quality.

The process of the invention can be carried out with all conventional fluorinated thermoplastics, for example with copolymers of tetrafluoroethylene with at least one comonomer selected from the group consisting of vinylidene fluoride, hexafluoropropene, chlorotrifluoroethylene, a lower perfluoro(alkyl vinyl) ether such as, for example, perfluoro(propyl vinyl) ether and ethylene.

The aqueous dispersion of the fluorinated thermoplastic can be prepared in a manner known per se. The polymerization can, for example, be initiated by means of the Permanganate system, since the resulting cations are at any rate removed from the system.

The replacement of the cations by hydrogen ions is preferably effected by a strongly acidic ion exchanger, which can be selected from the many commercial varieties, if necessary by means of simple preliminary tests. The selection is based on the demand that essentially all cations are removed from the polymer dispersion, as any remaining can adversely affect the product quality.

The dispersion so obtained is first compressed, if necessary after dilution with water, then decompressed through nozzles or slits and thereby coagulated. This procedure can be carried out in commercial high pressure homogenizers. The compressive pressure depends on the available apparatus, usual pressures being from 200 to 400 bar, advantageously about 300 bar.

The coagulated phase forms a more or less thick slurry or foam. This is diluted with water if necessary, in which case the dilution may be carried out in a mixing vessel. If required, the mixture can also be heated to temperatures of up to about 50° C., to aid transport and further processing.

The coagulated phase so obtained which can easily be transported is then fed to the filter apparatus. This is advantageously a filter belt press, onto the filter belt of which the coagulated material is applied in a thin layer. The thickness of this layer is such that the auxiliary chemicals from the polymerization can readily be washed out.

As the process achieves coagulation without chemical auxiliaries such as strong acids, the polymerization aids such as, for example, perfluorooctanoic acid, the salt of which has been added as emulsifier, are present in relatively easily soluble form. This not only makes the process of the invention easier, but also saves washing liquid. Recovery of the polymerization aids is thereby also made easier and waste water pollution reduced. The preferred washing liquid is water of a temperature of preferably at least 60° C., advantageously from 80° to 90° C.

The washed coagulated material is fed into the pressing zone of the filter belt press, where it is partially dewatered mechanically. This considerably reduces the energy consumption during any final drying.

The press cake resulting from this mechanical predrying is then broken up to give a free-flowing product in a manner known per se, advantageously in a mill and subsequently in a compactor, comprising crushing rollers with die (baseplate with holes). This results in readily free-flowing pellets which no longer take up water. These pellets contain from about 2 to 12% by weight of residual moisture, depending on the polymer.

This free-flowing product can, if required, readily be dried continuously, for example in a fluidized bed or in a tower dryer. The drying conditions are determined in a manner known per se by the material properties, in particular by the thermal sensitivity of the polymer. It is of course also possible to carry out the drying process in such a way that any adhering volatile impurities, for example residual perfluorooctanoic acid, are removed and recovered from the waste air, especially when this recovery from the waste air is more favorable than from the waste water.

The products dried to the desired residual moisture content can be processed very well, so that, for example, the dryer can be combined directly with a melt extruder. Highly efficient extrusion of the melt is thereby made possible.

The dried product can also be very readily ground and can be fed directly and continuously to a mill.

At low residual moisture contents, extrusion of a melt can be performed in a twin-screw extruder with degassing without prior drying.

The invention is further illustrated by the examples below. Percentages are by weight.

EXAMPLE 1

A 33% strength aqueous dispersion of a terpolymer comprising 60% of tetrafluoroethylene, 25% of vinylidene fluoride and 15% of hexafluoropropene, which contains the ammonium salt of perfluorooctanoic acid as emulsifier and manganese(II) ions from the initiator system, is pumped through a column containing a commercial strongly acidic ion exchanger (®LEWATIT SP 112, Bayer AG, Leverkusen). The column packing is of such a size that the residual content of each type of cation is below 0.2 ppm.

The deionized eluate is diluted with fully deionized water to a concentration of 18% of polymer and pumped into a high pressure homogenizer (manufacturer: APV Gaulin GmbH, Lübeck). The dispersion is compressed to 300 bar in the homogenizer and decompressed through a narrow annular slit. The dispersion coagulates quantitatively, giving a thick slurry. This slurry is fed to a mixing vessel, where it is diluted with fully deionized water to a solids content of 10% and heated to 40° C. The readily flowable slurry so obtained is pumped onto the filter belt of a filter belt press, spread out to a thin layer and washed with water at from 80° to 90° C. The auxiliary chemicals from the polymerization (emulsifier, chain transfer agent and similar) are thus largely removed. The washed slurry is dewatered in the pressing zone of the filter belt press to a residual water content of 17%. The press cake formed falls from the filter belt press into a mill in which it is broken up. The pieces of press cake from the mill fall into a compactor (crushing rollers with die, manufacturer: Kahl, Hamburg), where they are pressed to give pellets with a length of 3 mm and a diameter of 2 mm. Further water is mechanically squeezed out during this operation, so that the pellets have a residual moisture content of 12%. These pellets are no longer wettable by water. The pellets are fed into a tower dryer, where they are dried in a countercurrent of air at 120° C.

The dried pellets can be directly fed by a conveyor screw into a melt extruder and converted to granulated material.

In a further embodiment of the invention, the dried pellets are continuously fed to a mill and ground to a fine powder.

EXAMPLE 2

A 25% strength aqueous dispersion of a terpolymer comprising 95% of tetrafluoroethylene, 3.5% of perfluoro-(propyl-vinyl) ether and 1.5% of hexafluoropropene, which contains the ammonium salt of perfluorooctanoic acid as emulsifier and manganese(II) ions from the initiator system, is pumped through a column containing a commercial strongly acidic ion exchanger (®LEWATIT SP 112, Bayer AG, Leverkusen). The column packing is of such a size that the residual content of each type of cation is below 0.2 ppm.

The deionized eluate is diluted with fully deionized water to a concentration of 16% of polymer and pumped into a high pressure homogenizer (manufacturer: APV Gaulin GmbH, Lübeck). The dispersion is compressed to 300 bar in the homogenizer and decompressed through a narrow annular slit. The dispersion coagulates quantitatively, giving a thick slurry. This slurry is fed to a mixing vessel, where it is diluted with fully deionized water to a solids content of 8% and heated to 40° C. The readily flowable slurry so obtained is pumped onto the filter belt of a filter belt press, spread out to a thin layer and washed with water at from 80° to 90° C. The auxiliary chemicals from the polymerization (emulsifier, chain transfer agent and similar) are thus largely removed. The washed slurry is dewatered in the pressing zone of the filter belt press to a residual water content of <12%. The press cake formed falls from the filter belt press into a mill in which it is broken up. The pieces of press cake from the mill fall into a compactor (crushing rollers with die, manufacturer: Kahl, Hamburg), where they are pressed to give pellets with a length of 3 mm and a diameter of 2 mm. Further water is mechanically squeezed out during this operation, so that the pellets have a residual moisture content of <4%. These pellets are no longer wettable by water. The pellets are fed into a tower dryer, where they are dried in a countercurrent of air at 290° C.

The dried pellets can be directly fed by a conveyor screw into a melt extruder and converted to granulated material.

EXAMPLE 3

A 20% strength aqueous dispersion of a terpolymer comprising 68% of tetrafluoroethylene, 24% of ethylene and 8% of perfluoro(propyl vinyl) ether, which contains the ammonium salt of perfluorooctanoic acid as emulsifier and manganese(II) ions from the initiator system, is pumped through a column containing a commercial strongly acidic ion exchanger (®LEWATIT SP 112, Bayer AG, Leverkusen). The column packing is of such a size that the residual content of each type of cation is below 0.2 ppm.

The deionized eluate is diluted with fully deionized water to a concentration of 17% of polymer and pumped into a high pressure homogenizer (manufacturer: APV Gaulin GmbH, Lübeck). The dispersion is compressed to 300 bar in the homogenizer and decompressed through a narrow annular slit. The dispersion coagulates quantitatively, giving a thick slurry. This slurry is fed to a mixing vessel, where it is diluted with fully deionized water to a solids content of 8% and heated to 40° C. The readily flowable slurry so obtained is pumped onto the filter belt of a filter belt press, spread out to a thin layer and washed with water at from 80° to 90° C. The auxiliary chemicals from the polymerization (emulsifier, chain transfer agent and similar) are thus largely removed. The washed slurry is dewatered in the pressing zone of the filter belt press to a residual water content of <12%. The press cake formed falls from the filter belt press into a mill in which it is broken up. The pieces of press cake from the mill fall into a compactor (crushing rollers with die, manufacturer: Kahl, Hamburg) where they are pressed to give pellets with a length of 3 mm and a diameter of 2 mm. Further water is mechanically squeezed out during this operation, so that the pellets have a residual moisture content of below 6%. These pellets are no longer wettable by water. The pellets are fed into a tower dryer, where they are dried in a countercurrent of nitrogen at 200° C. The dried pellets can be directly fed by a conveyor screw into a melt extruder and converted to granulated material.

What is claimed is:

1. A process for working up aqueous dispersions of fluorinated thermoplastics which comprises substantially replacing by hydrogen ions the cations in the aqueous dispersion which have resulted from the polymerization, compressing the dispersion, optionally after dilution with water, coagulating the compressed dispersion by decompressing it through one or more opening(s) small enough to provide coagulation, said compressing step being carried out at sufficient pressure to induce coagulation when said compressed dispersion is decompressed, transferring the resulting coagulated phase, optionally after dilution with water and/or heating, onto a filter, washing the product there, dewatering the resulting product mechanically, and breaking up the product to give a free-flowing product.

2. The process as claimed in claim 1, wherein the working up is carried out continuously.

3. The process as claimed in claim 1, wherein the fluorinated thermoplastic is a copolymer of tetrafluoroethylene with at least one comonomer selected from the group consisting of vinylidene fluoride, hexafluoropropene, chlorotrifluoroethylene, a lower perfluoro(alkyl vinyl) ether and ethylene.

4. The process as claimed in claim 1, wherein the replacing of the cations is carried out with a strongly acidic ion exchanger.

5. The process as claimed in claim 1, wherein the compressing and decompressing of the dispersion are carried out in a high pressure homogenizer.

6. The process as claimed in claim 1, wherein the filter is a filter belt press.

7. The process as claimed in claim 1, wherein washing is carried out with water of at least 60° C.

8. The process as claimed in claim 1, wherein the breaking up is carried out in a mill with attached compactor.

9. The process as claimed in claim 1, wherein said free-flowing is dried to a predetermined moisture content.

10. The process as claimed in claim 9, wherein drying to the desired residual moisture content is carried out in a tower dryer.

11. The process as claimed in claim 10, wherein the product from the tower dryer is fed directly to a mill or to a melt extruder.

12. The process as claimed in claim 1, wherein the fluorinated thermoplastic is a copolymer.

13. The process as claimed in claim 1, wherein said cations in the aqueous dispersion include Mn (II) ions.

* * * * *